No. 839,854. PATENTED JAN. 1, 1907.
H. JONES.
VALVE.
APPLICATION FILED NOV. 21, 1905.
Fig. 1.
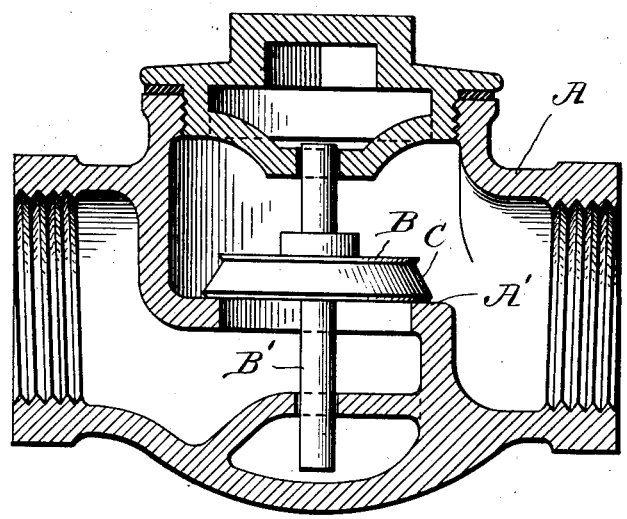
Fig. 2. Fig. 3. Fig. 4.
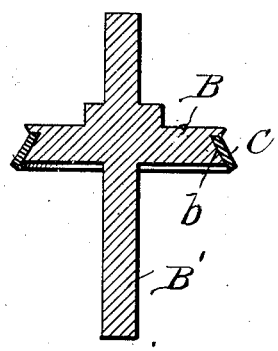 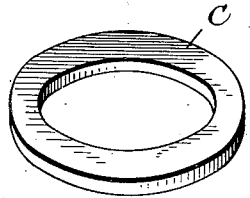 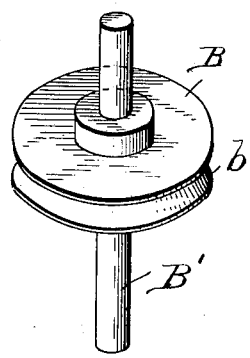
Fig. 5.
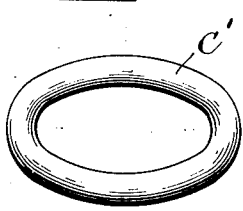
WITNESSES: INVENTOR
Harry L. Omer. Harry Jones.
Barker O. Sweet Jr. BY
E. M. Marble
ATTORNEY

UNITED STATES PATENT OFFICE.

HARRY JONES, OF WASHINGTON, DISTRICT OF COLUMBIA.

VALVE.

No. 839,854.  Specification of Letters Patent.  Patented Jan. 1, 1907.

Application filed November 21, 1905. Serial No. 288,454.

*To all whom it may concern:*

Be it known that I, HARRY JONES, a citizen of the United States, residing at Washington, in the District of Columbia, have invented new and useful Improvements in Valves, of which the following is a specification.

My invention relates to valves; and it consists in the construction and arrangement of the several parts, which will be fully described in the specification, illustrated in the drawings, and particularly pointed out in the claims.

One object of my invention is to provide a cushion on the edge of the valve which will lessen the wear on the valve and on the valve-seat.

Another object of my invention is to relieve the pressure between the valve and valve-seat.

A further object of my invention is to prevent grit or sediment collecting between the valve and the valve-seat.

I accomplish these objects by the constructions shown in the accompanying drawings, forming a part of this application, and in which—

Figure 1 shows my improvements on a valve in position in a vertical sectional view of a valve-casing. Fig. 2 shows the valve with an annular groove and valve-stem after the ring or gasket is applied. Fig. 3 shows the ring or gasket in the form before being applied to the valve, as shown in Fig. 1. Fig. 4 shows the valve with a hollow groove around the periphery; and Fig. 5 shows a ring or gasket in one of the forms intended to be applied on valves having a semicircular groove in the edge of the valve, as shown in Fig. 4.

Referring to the drawings, A represents a vertical section of a valve-casing, and A' the valve-seat.

B represents a valve, and B' the valve-stem, and *b* the groove in the edge of the valve.

C and C' represent the rings or gaskets which I apply to the valves.

The valves heretofore devised, while possessing merit, have been defective in some features, which I seek to remedy. To lessen the wear on the valve and the valve-seat, a cushion is needed, so that the force of their coming together may be relieved. To remedy this defect, I provide a groove, angular or curved, in the edge of the valve, as shown in Figs. 2 and 4, and in this groove I place an elastic ring or gasket, preferably made of rubber, which fills the groove in the valve and may extend slightly beyond the periphery of the same. I preferably construct this ring or gasket so that it shall extend beyond the periphery of the valve and also slightly below said periphery, but not so as to prevent the lower face of the valve from coming in full and close contact with the valve-seat, as the gasket will turn up to permit such seating. In this way it results that the sediment, grit, or sand which may have caught under the valve during its preceding action will be liberated and washed away by the liquid passing from below the valve, around, and above it by the succeeding action.

Having thus fully described my invention, what I claim, and desire to secure by Letters Patent, is—

1. The combination with a valve-casing provided with a port surrounded by a valve-seat, of a valve-body provided with a surface of greater diameter than said port opposed to said seat and in position to engage it and having a groove in its periphery adjacent to said surface but more remote from said seat, and an elastic ring seated in said groove and projecting beyond both of its walls.

2. The combination with a valve-casing provided with a port surrounded by a valve-seat, of a valve-body provided with a surface of greater diameter than said port opposed to said seat and in position to engage it and having a groove in its periphery adjacent to said surface but more remote from said seat, and an elastic ring seated in said groove and projecting beyond both of its walls and normally extending beyond said body in the direction of said seat.

3. A reciprocating valve comprising an integral rigid body having a seating-surface transverse to its direction of movement, and a groove in its periphery adjacent to said surface, and a flexible and elastic ring lying in said groove and projecting radially beyond its walls.

In testimony whereof I affix my signature in presence of two subscribing witnesses.

HARRY JONES.

Witnesses:
 BLANCHE L. CHADWELL,
 PARKER H. SWEET, Jr.